United States Patent
Schaul et al.

(10) Patent No.: US 12,061,964 B2
(45) Date of Patent: Aug. 13, 2024

(54) MODULATING AGENT BEHAVIOR TO OPTIMIZE LEARNING PROGRESS

(71) Applicant: DeepMind Technologies Limited, London (GB)

(72) Inventors: Tom Schaul, London (GB); Diana Luiza Borsa, London (GB); Fengning Ding, London (GB); David Szepesvari, London (GB); Georg Ostrovski, London (GB); Simon Osindero, London (GB); William Clinton Dabney, London (GB)

(73) Assignee: DeepMind Technologies Limited, London (GB)

( * ) Notice: Subject to any disclaimer, the term of this patent is extended or adjusted under 35 U.S.C. 154(b) by 993 days.

(21) Appl. No.: 17/032,562

(22) Filed: Sep. 25, 2020

(65) Prior Publication Data
US 2021/0089908 A1    Mar. 25, 2021

Related U.S. Application Data

(60) Provisional application No. 62/906,030, filed on Sep. 25, 2019.

(51) Int. Cl.
*G06N 3/006* (2023.01)
*G06F 18/214* (2023.01)
(Continued)

(52) U.S. Cl.
CPC ......... *G06N 3/006* (2013.01); *G06F 18/2148* (2023.01); *G06F 18/2415* (2023.01);
(Continued)

(58) Field of Classification Search
CPC .......... G06N 3/006; G06N 3/08; G06V 10/82; G06V 40/20; G06V 10/764; G06F 18/2148; G06F 18/2415
See application file for complete search history.

(56) References Cited

U.S. PATENT DOCUMENTS 10,242,666 B2 *  3/2019  Monceaux ............. G06N 3/008
11,537,439 B1 * 12/2022  Liberty .................. G06F 9/5077
(Continued)

OTHER PUBLICATIONS

Bellemare et al., "The arcade learning environment: An evaluation platform for general agents," Journal of Artificial Intelligence Research, 2013, 47:253-279.
(Continued)

*Primary Examiner* — William L Bashore
*Assistant Examiner* — Gregory A DiStefano
(74) *Attorney, Agent, or Firm* — Fish & Richardson P.C.

(57) ABSTRACT

Methods, systems, and apparatus, including computer programs encoded on computer storage media, for controlling an agent. One of the methods includes sampling a behavior modulation in accordance with a current probability distribution; for each of one or more time steps: processing an input comprising an observation characterizing a current state of the environment at the time step using an action selection neural network to generate a respective action score for each action in a set of possible actions that can be performed by the agent; modifying the action scores using the sampled behavior modulation; and selecting the action to be performed by the agent at the time step based on the modified action scores; determining a fitness measure corresponding to the sampled behavior modulation; and updating the current probability distribution over the set of possible behavior modulations using the fitness measure corresponding to the behavior modulation.

20 Claims, 4 Drawing Sheets

(51) Int. Cl.
  *G06F 18/2415* (2023.01)
  *G06N 3/08* (2023.01)
  *G06V 10/764* (2022.01)
  *G06V 10/82* (2022.01)
  *G06V 40/20* (2022.01)

(52) U.S. Cl.
  CPC ............. *G06N 3/08* (2013.01); *G06V 10/764* (2022.01); *G06V 10/82* (2022.01); *G06V 40/20* (2022.01)

(56) References Cited

U.S. PATENT DOCUMENTS

| | | | |
|---|---|---|---|
| 2014/0195195 A1* | 7/2014 | Fishel | A61B 5/01 702/181 |
| 2018/0314978 A1* | 11/2018 | Kajino | G06N 20/00 |
| 2019/0019082 A1* | 1/2019 | Dasgupta | G06N 3/063 |
| 2019/0155918 A1* | 5/2019 | Jaroch | G06N 3/084 |
| 2019/0156197 A1* | 5/2019 | Dasgupta | G06N 3/08 |
| 2019/0354868 A1* | 11/2019 | Wierstra | G06N 3/04 |
| 2019/0378043 A1* | 12/2019 | Pippenger | G06F 16/2379 |
| 2021/0174144 A1* | 6/2021 | Chen | G06N 20/00 |

OTHER PUBLICATIONS

Bellemare et al., "A distributional perspective on reinforcement learning," CoRR, Jul. 2017, arxiv.org/abs/1707.06887, 19 pages.
Bergstra et al., "Algorithms for hyper-parameter optimization," Advances in neural information processing systems 24, 2011, pp. 2546-2554.
Besbes et al., "Stochastic multi-armed-bandit problem with non-stationary rewards," Advances in Neural Information Processing Systems, 2014, pp. 199-207.
Borsa et al., "Universal successor features approximators," CoRR, Dec. 2018, arxiv.org/abs/1812.07626, 24 pages.
Czarnecki et al., "Mix&match—agent curricula for reinforcement learning," CoRR, Jun. 2018, arXiv:1806.01780, 12 pages.
Dabney et al., "Distributional reinforcement learning with quantile regression," CoRR, Oct. 2017, arxiv.org/abs/1710.10044, 14 pages.
Dulac-Arnold et al., "Deep reinforcement learning in large discrete action spaces," CoRR, Dec. 2015, arXiv:1512.07679, 11 pages.
Espeholt et al., "IMPALA: Scalable distributed deep-rl with importance weighted actor-learner architectures," CoRR, Feb. 2018, arXiv:1802.01561, 22 pages.
Eysenbach et al., "Diversity is all you need: Learning skills without a reward function," CoRR, Feb. 2018, arXiv:1802.06070, 22 pages.
Fortunato et al., "Noisy networks for exploration," CoRR, Jun. 2017, arxiv.org/abs/1706.10295, 21 pages.
Garcia et al., "A comprehensive survey on safe reinforcement learning," Journal of Machine Learning Research, 2015, 16(42):1437-1480.
Ghosh et al., "Learning actionable representations with goal conditioned policies," CoRR, Nov. 2018, arXiv:1811.07819, 18 pages.
Haarnoja et al., "Latent space policies for hierarchical reinforcement learning," CoRR, Apr. 2018, arXiv:1804.02808, 11 pages.
Hessel et al., "Rainbow: Combining improvements in deep reinforcement learning," CoRR, Oct. 2017, arxiv.org/abs/1710.02298, 14 pages.
Hessel et al., "On inductive biases in deep reinforcement learning," CoRR, Jul. 2019, arxiv.org/abs/1907.02908, 14 pages.
Horgan et al., "Distributed prioritized experience replay," CoRR, Mar. 2018, arxiv.org/abs/1803.00933, 19 pages.
Itti et al., "Bayesian surprise attracts human attention," Advances in Neural Information Processing Systems, 2005, 18:547-554.
Jaderberg et al., "Population based training of neural networks," CoRR, Nov. 2017, arxiv.org/abs/1711.09846, 21 pages.
Machado et al., "Revisiting the arcade learning environment: Evaluation protocols and open problems for general agents," JAIR, 2018, 61:523-562.
Mirolli et al., "Functions and mechanisms of intrinsic motivations," Intrinsically Motivated Learning in Natural and Artificial Systems, 2012, 28 pages.
Mnih et al., "Human-level control through deep reinforcement learning," Nature, Feb. 2015, 518(7540):529.
Nagarajan et al., "The impact of nondeterminism on reproducibility in deep reinforcement learning," ICML 2018, Jul. 2018, 10 pages.
Nair et al., "Visual reinforcement learning with imagined goals," Advances in Neural Information Processing Systems 31, 2018, pp. 9191-9200.
Oudeyer et al., "Intrinsic motivation systems for autonomous mental development," IEEE Transactions on Evolutionary Computation, Apr. 2007, 11(2):265-286.
Plappert et al., "Parameter space noise for exploration," CoRR, Jun. 2017, arxiv.org/abs/1706.01905, 18 pages.
Raj et al., "Taming non-stationary bandits: A Bayesian approach," CoRR, Jul. 2017, arxiv.org/abs/1707.09727, 16 pages.
Schaul et al., "Prioritized experience replay," CoRR, Nov. 2015, arxiv.org/abs/1511.05952, 21 pages.
Schmidhuber, "Curious model-building control systems," Proc. International Joint Conference on Neural Networks, 1991, 2:1458-1463.
Schmidhuber, "Driven by compression progress: A simple principle explains essential aspects of subjective beauty, novelty, surprise, interestingness, attention, curiosity, creativity, art, science, music, jokes," Workshop on anticipatory behavior in adaptive learning systems, 2008, pp. 48-76.
Such et al., "An Atari model zoo for analyzing, visualizing, and comparing deep reinforcement learning agents," CoRR, Dec. 2016, arXiv:1812.07069, 20 pages.
Wang, "A class of distortion operators for pricing financial and insurance risks," Journal of Risk and Insurance, Mar. 2000, 67(1):15-36.
Xu et al., "Meta-gradient reinforcement learning," Advances in Neural Information Processing Systems 31, 2018, pp. 2396-2407.
Zha et al., "Experience replay optimization," CoRR, Jun. 2019, arxiv.org/abs/1906.08387, 7 pages.
Schaul et al., "Adapting Behavior for Learning Progress," CoRR, Dec. 2019, arxiv.org/abs/1912.06910, 23 pages.

* cited by examiner

MODULATING AGENT BEHAVIOR TO OPTIMIZE LEARNING PROGRESS

CROSS-REFERENCE TO RELATED APPLICATION

This application claims the benefit of U.S. Provisional Application No. 62/906,030, filed Sep. 25, 2020, the contents of which are incorporated by reference herein.

BACKGROUND

This specification relates to controlling agents using neural networks.

Neural networks are machine learning models that employ one or more layers of nonlinear units to predict an output for a received input. Some neural networks include one or more hidden layers in addition to an output layer. The output of each hidden layer is used as input to or more other layers in the network, i.e., one or more other hidden layers, the output layer, or both. Each layer of the network generates an output from a received input in accordance with current values of a respective set of parameters.

SUMMARY

This specification describes a system implemented as computer programs on one or more computers in one or more locations that controls an agent interacting an environment by modulating policy outputs that are generated by an action selection neural network using modulation factors.

Particular embodiments of the subject matter described in this specification can be implemented so as to realize one or more of the following advantages.

The system described in this specification can select an action to be performed by an agent by processing an observation to generate a set of action scores, modifying the action scores using a behavior modulation, and then selecting the action based on the modified action scores. Modifying the action scores using the behavior modulation changes the behavior policy of the agent (i.e., relative to the behavior policy specified by the action scores) and thereby facilitates exploration of the environment by the agent. Exploring the environment may enable agent to learn to accomplish tasks in the environment more quickly and effectively.

Rather than using a fixed exploration policy (e.g., specified by a single, fixed behavior modulation), the system described in this specification repeatedly adjusts the exploration policy over time. To adjust the exploration policy, the system samples a behavior modulation in accordance with a probability distribution over a set of possible behavior modulation factors, and uses the sampled behavior modulation to modify the behavior policy of the agent. The system adaptively updates the probability distribution over the set of possible behavior modulations to optimize the estimated learning progress of the agent. In this manner, the system can autonomously tailor exploration to the task being accomplished by the agent and to the current skill of the agent at accomplishing the task. The system described in this specification can reduce consumption of computational resources (e.g., memory and computing power) during training by enabling the agent to reach an acceptable level of performance over fewer training iterations, and can enable the trained agent to accomplish tasks more effectively (e.g., more quickly).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that controls an agent interacting with an environment.

In some implementations, the environment is a real-world environment and the agent is a mechanical agent interacting with the real-world environment. For example, the agent may be a robot interacting with the environment, e.g., to locate an object of interest in the environment, to move an object of interest to a specified location in the environment, to physically manipulate an object of interest in the environment, or to navigate to a specified destination in the environment; or the agent may be an autonomous or semi-autonomous land, air, or sea vehicle navigating through the environment to a specified destination in the environment.

In these implementations, the observations may include, for example, one or more of images, object position data, and sensor data to capture observations as the agent interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

The actions may be control inputs to control a robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example in the case of an autonomous or semi-autonomous land, air, or sea vehicle the actions may include actions to control navigation e.g. steering, and movement e.g., braking and/or acceleration of the vehicle.

In some implementations the environment is a simulated environment and the agent is implemented as one or more computers interacting with the simulated environment.

Training an agent in a simulated environment may enable the agent to learn from large amounts of simulated training data while avoiding risks associated with training the agent in a real world environment, e.g., damage to the agent due to performing poorly chosen actions. An agent trained in a simulated environment may thereafter be deployed in a real-world environment.

For example the simulated environment may be a motion simulation of a robot or vehicle, e.g., a driving simulation or a flight simulation. In these implementations, the actions may be control inputs to control the simulated user or simulated vehicle.

In another example, the simulated environment may be a video game and the agent may be a simulated user playing the video game.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

Generally in the case of a simulated environment the observations may include simulated versions of one or more of the previously described observations or types of observations and the actions may include simulated versions of one or more of the previously described actions or types of actions.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

In some applications, the environment is a content recommendation environment and the actions correspond to different items of content that can be recommend to a user. That is, each action is a recommendation of the corresponding item of content to the user. In these applications, the observations are data that represent the context of the content recommendation, e.g., data characterizing the user, data characterizing content items previously presented to the user, currently presented to the user, or both.

Optionally, in any of the above implementations, the observation at any given time step may include data from a previous time step that may be beneficial in characterizing the environment, e.g., the action performed at the previous time step.

Figure 1A:
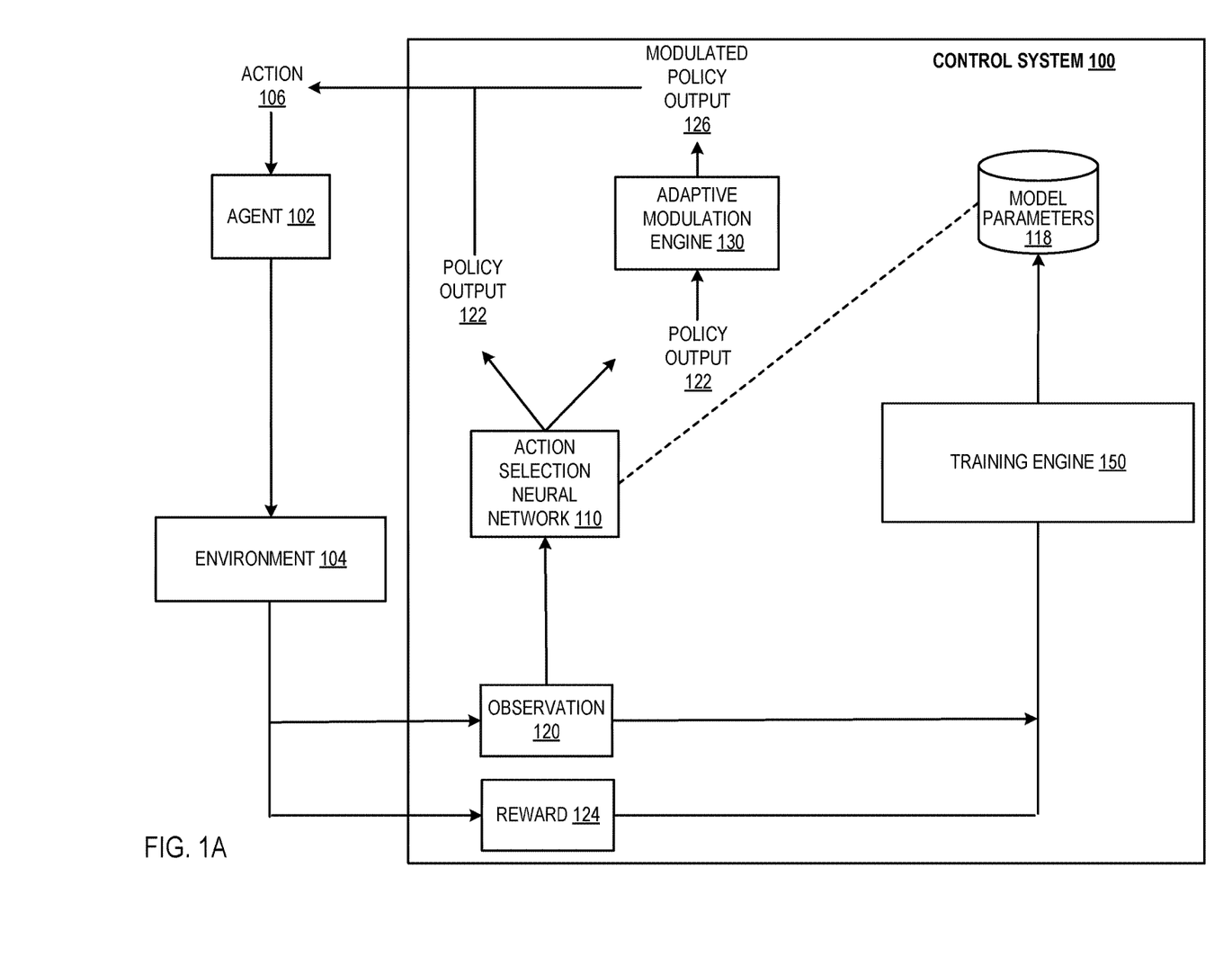
FIG. 1A shows an example control system.

FIG. 1 shows an example control system 100. The control system 100 is an example of a system implemented as computer programs on one or more computers in one or more locations in which the systems, components, and techniques described below are implemented.

The system 100 includes an action selection neural network 110, a training engine 150, and one or more memories storing a set of policy parameters 118 of the action selection neural network 110.

The system 100 controls an agent 102 interacting with an environment 104 by selecting actions 106 to be performed by the agent 102 in response to observations 120 and then causing the agent 102 to perform the selected actions 106.

Performance of the selected actions 106 by the agent 102 generally causes the environment 104 to transition into new states and causes the agent to receive a reward 124 from the environment 104.

Generally, the reward 124 is a numerical value that represents a quality of the selected action 106, e.g., in terms of progress toward completing the specified task in the environment.

By repeatedly causing the agent 102 to act in the environment 104, the system 100 can control the agent 102 to complete a specified task.

In particular, the control system 100 controls the agent 102 using the action selection neural network 110 in order to cause the agent 102 to perform the specified task in the environment 104.

Each sequence of time steps during which the agent is attempting to perform an instance of the task will be referred to in this specification as a task episode. In other words, a task episode begins when the agent begins attempting to perform an instance of the task and ends when the agent stops attempting to perform the instance of the task, i.e., successfully completes the task or satisfies a failure condition for failing to perform the task.

Each input to the action selection neural network 110 can include an observation 120 characterizing the state of the environment 104 being interacted with by the agent 102.

The policy output 122 of the action selection neural network 110 for a given input can define an action 106 to be performed by the agent in response to the observation in the input. More specifically, the policy output 122 of the action selection neural network 110 specifies a respective action score for each action in a set of possible actions that can be performed by the agent.

In some cases, the policy output 122 directly includes a respective action score for each action in the set of possible actions.

In some other cases, the action selection neural network 110 is a distributional neural network and the policy output 122 includes, for each action, data characterizing a probability distribution over possible returns that would result from the agent performing the action, i.e., over possible action scores for the agent. For example, the policy output 122 can include a respective probability for each of a number of quantiles that represents the likelihood that the action score falls in the quantile.

The action selection neural network 110 can have any appropriate architecture for mapping an observation to a policy output.

As a particular example, the action selection neural network 110 can have an encoder neural network that encodes the received observation into an encoded representation.

For example, when the observations are images, the encoder neural network can be a stack of convolutional neural network layers, optionally followed by one or more fully connected neural network layers and/or one or more recurrent neural network layers, that maps the observation to a more compact representation. When the observations include additional features in addition to images, e.g., proprioceptive features, the additional features can be provided as input to the one or more fully connected layers with the output of the convolutional stack.

When the observations are only lower-dimensional data, the encoder neural network can be a multi-layer perceptron that encodes the received observation.

The action selection neural network 110 can then process the encoded representation through a stack of fully-connected neural network layers, recurrent layers, or both to generate the policy output.

As another example, the action selection neural network 110 can receive as input an observation and an action and generate an output for the action that specifies the action score for the action. The system 100 can then process the observation and each action in the set using the neural network 110 to generate the policy output 122. For example, the neural network 110 can have a similar architecture as that described above but can append an encoded representation of the action to the output of the encoder neural network for the observation.

The parameters of the action selection neural network 110 will be referred to as the "policy parameters" 118.

After training, the system 100 can then cause the agent to perform an action using the policy output 122, e.g., by selecting the action to be performed by the agent by sampling from a probability distribution over the actions defined by the policy output 122 or by selecting the highest-scoring action in the policy output 122.

During training, however, the system 100 uses an adaptive modulation engine 130 to modify the policy output 122 to generate a modulated policy output 126 that includes a respective modified action score for each of the actions. The system 100 then uses the modulated policy output 126 instead of the policy output 122 to select the action to be performed by the agent, e.g., by selecting the action to be performed by the agent by sampling from a probability distribution over the actions defined by the modulated policy output 126 or by selecting the highest-scoring action in the modulated output policy output 126.

The adaptive modulation engine 130 generates the modulated policy output 126 by sampling a modulation from a current probability distribution over possible modulations and then applying the sampled modulation to the policy output 122.

The probability distribution and sampling from the probability distribution are described in more detail below with reference to FIGS. 1B and 2.

The modulation generally includes a respective value for each of one or more modulation factors.

The modulation can include any of a variety of modulation factors that each specify a different modification to one or more of the action scores specified by the policy output 122. A description of example modulation factors that can be included in the modulation follows.

As one example, the one or more behavior modulation factors can include a behavior modulation factor that specifies a respective bias value for each action in the set of possible actions. The system can then modify the action scores by adding the corresponding bias value to each action score. Thus, different possible values for this modulation factor specify different bias values to be applied to the actions in the action set.

As another example, the one or more behavior modulation factors include a behavior modulation factor that specifies a temperature parameter. The system can then modify the action scores using the behavior modulation factor by dividing each action score by the temperature parameter, e.g., before applying a softmax to the modified action scores to generate a probability distribution. Thus, different possible values for this modulation factor specify different temperature values.

As another example, the one or more behavior modulation factors can include a behavior modulation factor that specifies an E probability value. The system can then modify the action scores using the behavior modulation by modifying the action scores such that, with probability given by the E probability value, each action has an equal likelihood of being selected to be performed by the agent and, with probability given by 1-probability value, the action scores are not modified based on the modulation factor. Thus, different possible values for this modulation factor specify different E probability values.

As another example, the one or more behavior modulation factors can include a behavior modulation factor that specifies an action-repeat probability value. The system can then modify the action scores using the behavior modulation factor by modifying the action scores such that, with probability given by the action-repeat probability value, the action selected to be performed by the agent at the time step is the action performed by the agent at a previous time step. Thus, different possible values for this modulation factor specify different action-repeat probability values.

As another example, when the action selection neural network 110 is a distributional neural network, the one or more behavior modulation factors can include a behavior modulation factor that specifies one or more parameters of a distortion function. The system can then modify the action scores using the behavior modulation by, for each action, applying the distortion function to the data characterizing the probability distribution over possible returns that would result from the agent performing the action to generated a distorted distribution and then determining the action score for the action from the distorted distribution.

When each modulation includes multiple ones of these modulation factors, the engine 130 applies the modulation by applying the sampled value for each of the multiple modulation factors to the policy output 122 according to some predefined order.

As a particular example, when the action selection neural network 110 is a distributional neural network and the modulation includes each of the example modulation factors given above, the modified action score for an action a in the set of actions A can satisfy:

$$(1-\epsilon)(1-\rho)\frac{e^{\frac{1}{T}(Q_w(s,a)+b_a)}}{\sum_{a'\in A}e^{\frac{1}{T}(Q_w(s,a')+b_{a'})}} + \frac{\epsilon(1-\rho)}{|A|} + \rho 1_{a=a_{t-1}},$$

Where $\epsilon$ is the $\epsilon$ probability value, $\rho$ is the action repeat probability value, T is the temperature value, $b_a$ is the bias value for the action a, $1_{a=a_{t-1}}$ is an indicator function that is equal to 1 when the action a is the same as the previous action $a_{t-1}$ that was performed by the agent and equal to 0 when the action a is not the same as the previous action $a_{t-1}$ that was performed by the agent, $$Q_w(s,a) = \frac{\sum_v e^{-wv}q_v}{\sum_v e^{-wv}},$$

where w is the parameter of the distortion function, v is a quantile, and $q_v$ is the score generated for the quantile v by the action selection neural network 110 by processing the observation s and data identifying the action a.

In order to improve the control of the agent 102, the training engine 150 repeatedly updates the policy parameters 118 of the action selection neural network 110 to cause the action selection neural network 110 to generate more accurate policy outputs, i.e., that result in higher rewards 124 being received by the system 100 for the task and, as a result, improve the performance of the agent 102 on the task.

For example, the training engine 150 can train the action selection neural network 110 using a conventional off-policy reinforcement learning technique, e.g., one that trains the neural network 110 on trajectories sampled from a replay memory or other data storage that stores trajectories generated as a result of the agent interacting with the environment. The system can sample trajectories from this memory for use in training either randomly or according to a prioritized experience replay sampling scheme.

The engine 130 also repeatedly updates the probability distribution over the possible modulations, e.g., after each episode of the task that is performed by the agent, during the training. Therefore, the modulations that are sampled by the engine 130 are adaptive and different modulations are sampled with different frequencies as training progress. More specifically, the engine 130 repeatedly updates the probability distributions so that modulations that are more beneficial to the training of the neural network 110 are sampled more frequently.

The operation of the engine 130 will be described in more detail below with reference to FIGS. 1B, 2, and 3.

Once the action selection neural network 110 is trained, the system 100 can either continue to use the action selection neural network 110 to control the agent 102 in interacting with the environment 104 or provide data specifying the trained action selection neural network 110, i.e., the trained values of the policy parameters, to another system for use in controlling the agent 102 or another agent.

Figure 1B:
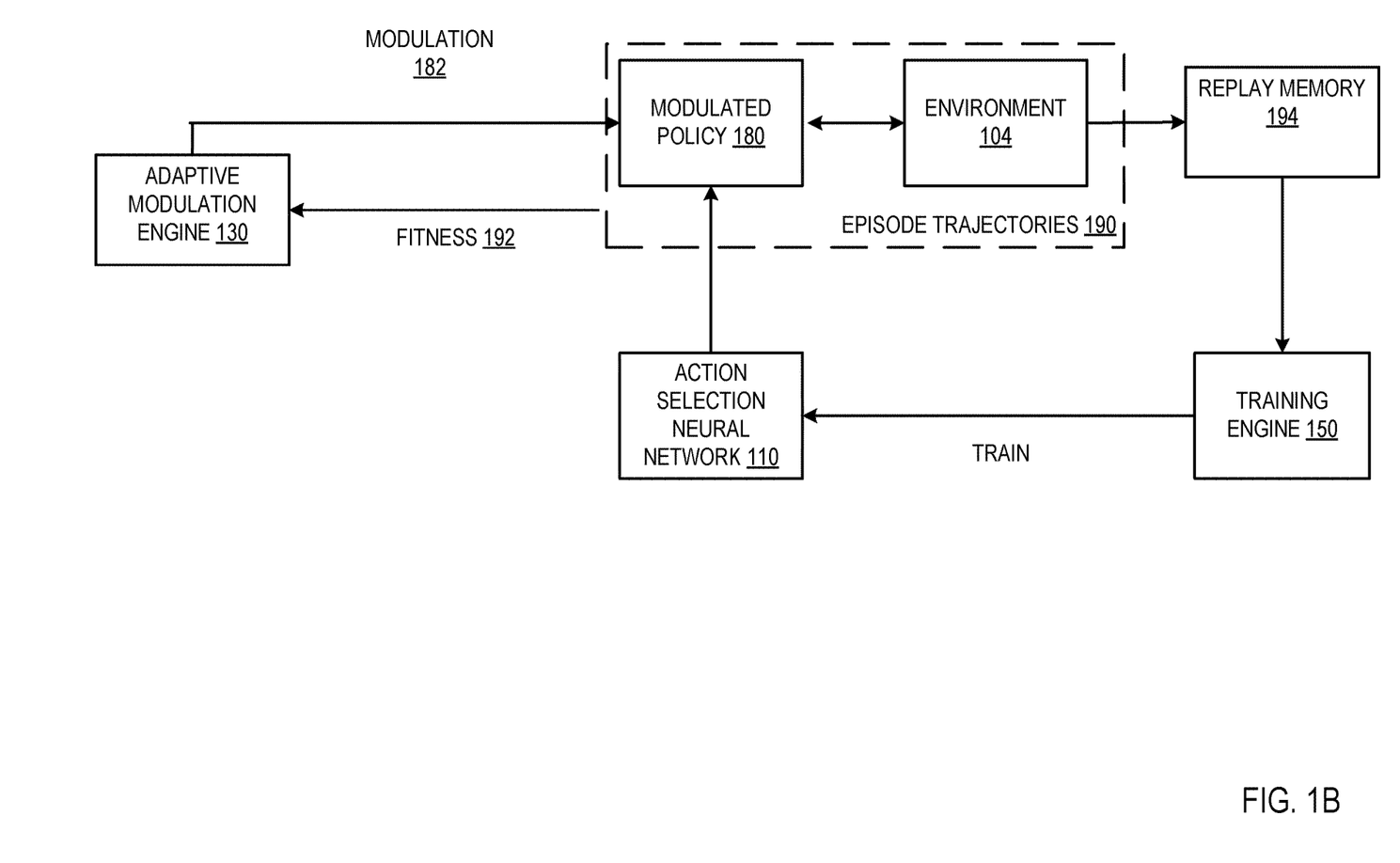
FIG. 1B shows an example of the operation of the adaptive modulation engine.

FIG. 1B shows the operation of the adaptive modulation engine 130.

In the example of FIG. 1B, the adaptive modulation engine 130 samples a modulation 182 and the system 100 uses the same sampled modulation 182 to select all of the actions performed by the agent 102 to perform an episode of a task.

In particular, the system controls the agent 102 using a modulated policy 180 that is generated by modulating outputs of the action selection neural network 110 using the modulation 182 in order to cause the agent to perform an episode of the task.

In other words, the system uses the same modulation 182 for the entire task episode. In this specification, the duration for which a sampled modulation is actually used to modulate the outputs of the action selection neural network 110 is referred to as a modulation period. Generally, the modulation period can be an entire episode or a portion of an episode. In other words, in some cases, the engine 130 samples new modulations at predetermined intervals within an episode, e.g., every N observations, where N is a fixed integer greater than or equal to one.

The system then generates an episode trajectory 190 that includes the observations received, actions performed, and rewards received during the performance of the task episode and stores the episode trajectory 190 in a replay memory 194. At a later time, the training engine 150 samples the episode trajectory 190 from the replay memory 194 and then uses the episode trajectory 190 to train the action selection neural network 110, e.g., through off-policy reinforcement learning.

The system also generates a fitness measure 192 that characterizes the performance of the sampled modulation 182 during the modulation period.

The fitness measure 192 generally characterizes an estimated progress in improving a performance of the agent in accomplishing the task that would result from training the action selection neural network 110 on training data characterizing interaction of the agent with the environment over the modulation period during where the action scores were modified using the sampled behavior modulation, e.g., that would result in training the action selection neural network 110 on the episode trajectory 190.

Examples of fitness measures are described below with reference to FIG. 2.

The engine 130 then uses the fitness measure 192 to update the current probability distribution over the set of possible behavior modulations, i.e., to assign higher probabilities to value of modulation factors that result in higher fitness measures.

An example technique for updating the current probability distribution is described in more detail below with reference to FIG. 2.

Thus, the engine 130 repeatedly updates the current probability distribution as the neural network 110 is trained and the agent continues to interact with the environment. This updating results in an adaptive exploration policy being applied that facilitates learning a high quality neural network 110.

Figure 2:
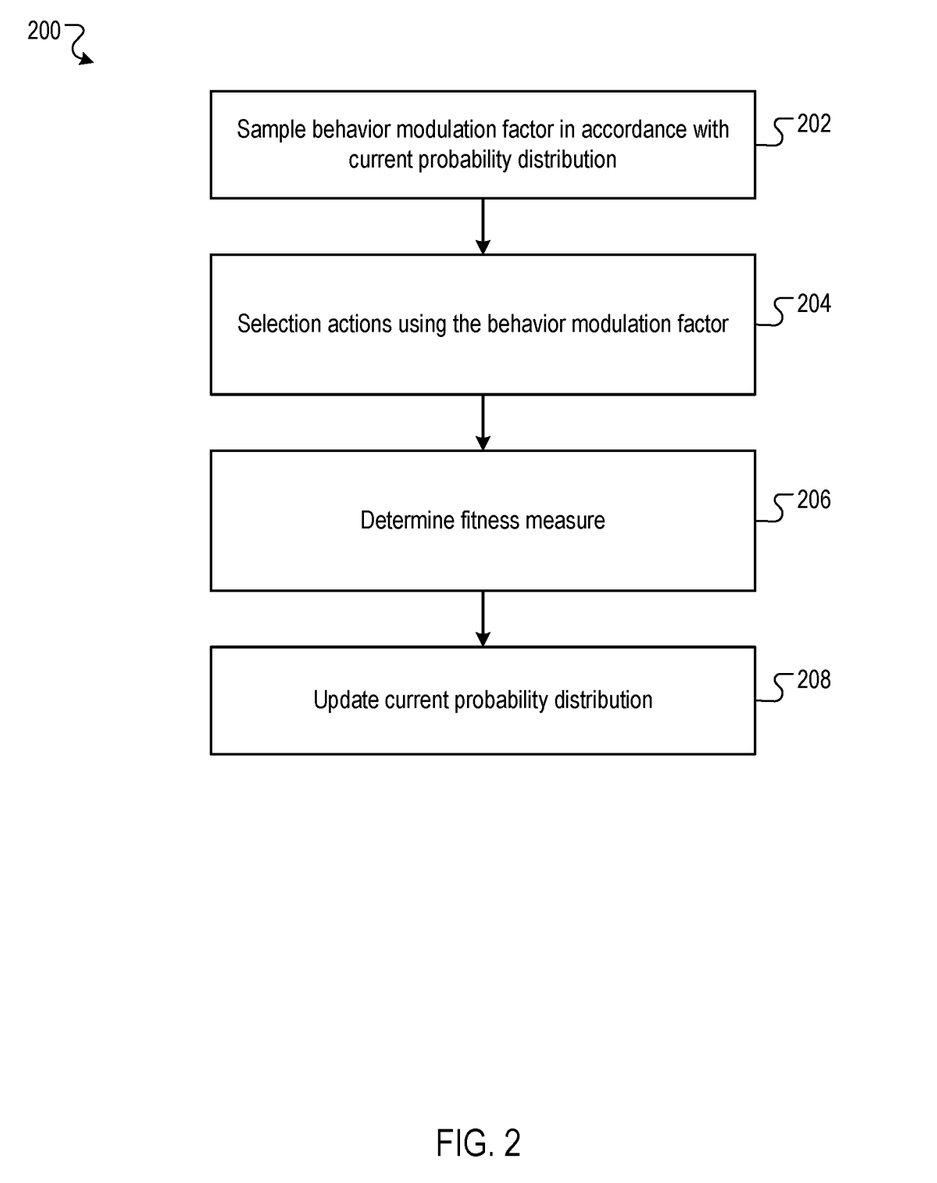
FIG. 2 is a flow diagram of an example process for controlling an agent.

FIG. 2 is a flow diagram of an example process 200 for controlling the agent. For convenience, the process 200 will be described as being performed by a system of one or more computers located in one or more locations. For example, a control system, e.g., the control system 100 of FIG. 1, appropriately programmed, can perform the process 200.

The system samples a behavior modulation from a set of possible behavior modulations in accordance with a current probability distribution over the set of possible behavior modulations (step 202). As described above, each possible behavior modulation includes a respective value for each of one or modulation factors.

When there are multiple modulation factors, in some implementations the current probability distribution is a combined probability distribution over a plurality of combinations, with each combination including a respective value for each of the multiple modulation functions. In these cases, the system samples a combination that includes a respective value for each of the multiple modulation factors from the combined probability distribution.

In some other implementations, when there are multiple modulation factors the current probability distribution is a multi-variate probability distribution that is made up of respective probability distributions for each of the modulation factors, with the respective probability distribution for each modulation factor being a probability distribution over the possible values for the factor. In these cases, the system samples a respective value for each of the multiple modulation factors from the respective probability distribution for the modulation factor.

The system selects actions using the behavior modulation factor as the agent performs an episode of the task and for a modulation duration that includes one or more time steps (step 204). In particular, at each time step during the modulation duration, the system processes an input that includes an observation characterizing a current state of the environment at the time step using the action selection neural network to generate a respective action score for each action in a set of possible actions that can be performed by the agent. The system then modifies the action scores using the sampled behavior modulation and selects the action to be performed by the agent at the time step based on the modified action scores.

The system determines a fitness measure for the modulation duration (step 206). Generally, the fitness measure characterizes an estimated progress in improving a performance of the agent in accomplishing the task that would result from training the action selection neural network on training data characterizing interaction of the agent with the environment over the one or more time steps where the action scores were modified using the sampled behavior modulation.

The system can use any of a variety of measures that are based on the rewards received in response to actions selected during the modulation duration as the fitness measure.

As one example, the system can use a fitness measure that measures an expected difference between a cumulative measure of rewards, e.g., a return or an undiscounted sum of rewards, received by the agent as a result of interacting with the environment by performing actions selected using the action selection neural network: (i) after the action selection neural network is trained on the training data characterizing the interaction of the agent with the environment over the modulation duration and (ii) before the action selection neural network is trained on the training data characterizing the interaction of the agent with the environment over the modulation duration. A particular example of such a fitness measure is the sum of the rewards received by the agent in response to each of the actions selected during the modulation duration, e.g., the total undiscounted sum of rewards received during the task episode. Another particular example of such a fitness measure is a difference between the sum of the rewards received by the agent during the modulation duration and the average of total rewards received during one or more previous modulation durations.

The system updates the current probability distribution over the set of possible behavior modulations using the fitness measure corresponding to the behavior modulation (step 208). Generally, the system updates the current probability distribution so that values of modulation factors that are more likely to result in higher measures of fitness have higher probabilities. One example technique for updating the probability distribution is described in more detail below with reference to FIG. 3.

The system can repeatedly perform the process 200 during training of the action selection neural network to cause the agent to effectively explore the environment and to learn an action selection neural network that can more accurately control the agent to perform the task, i.e., relative to other techniques for training the neural network that do not modulate the outputs or that modulate the outputs using a different scheme.

Figure 3:
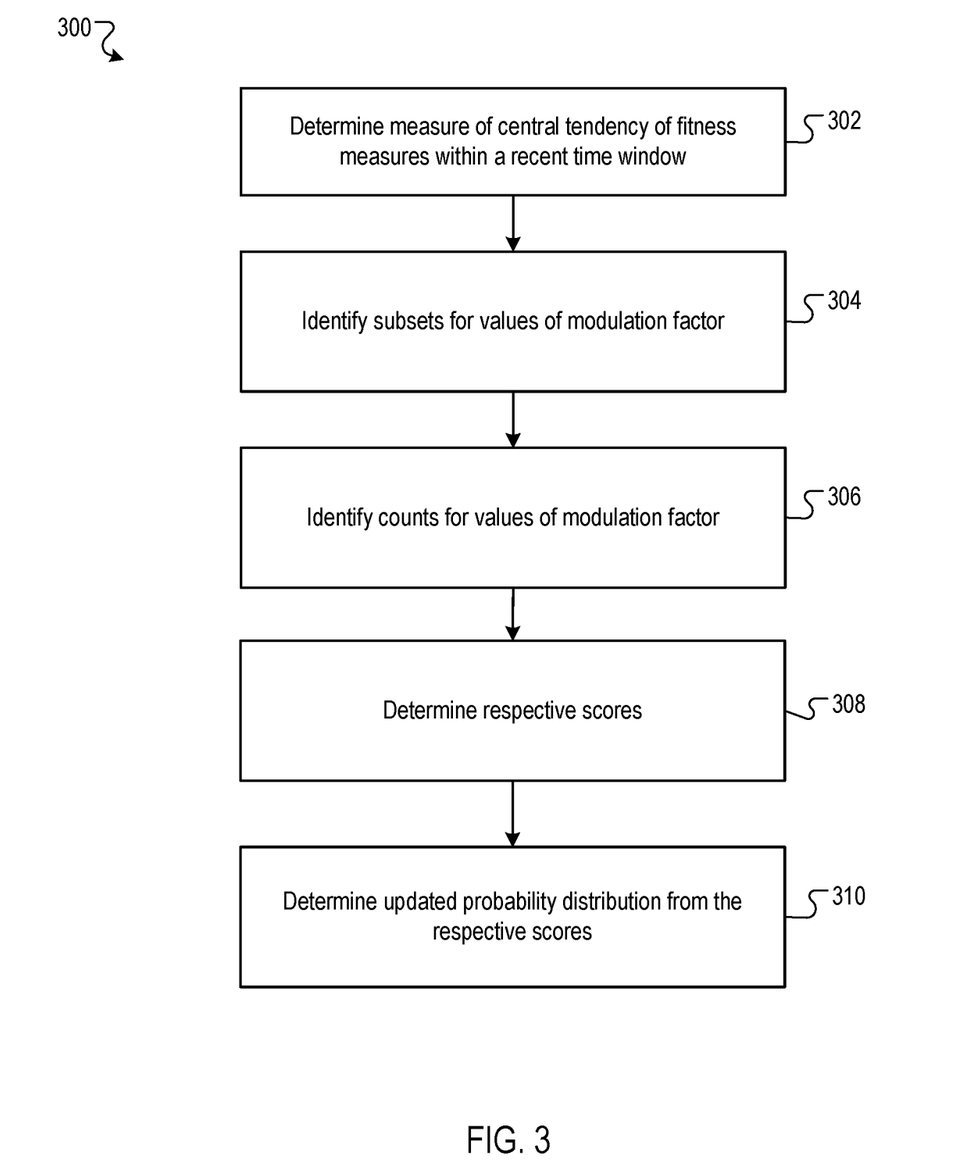
FIG. 3 is a flow diagram of an example process for updating the current probability distribution.

FIG. 3 is a flow diagram of an example process 300 for updating the probability distribution. For convenience, the process 300 will be described as being performed by a system of one or more computers located in one or more locations. For example, a control system, e.g., the control system 100 of FIG. 1, appropriately programmed, can perform the process 300.

In implementations where each behavior modulation includes a respective value for multiple behavior modulation factors and the system samples the behavior modulation by, for each behavior modulation factor, independently sampling from a probability distribution over possible values for the behavior modulation factors, the system performs the process 300 independently for each behavior modulation factor to update the probability distribution over possible values for the behavior modulation factor. Thus, the process 300 will be described with reference to updating a probability distribution over possible values for a given behavior modulation factor.

However, in implementations where each behavior modulation includes a respective value for multiple behavior modulation factors and the system samples the behavior modulation by sampling from a combined probability distribution that assigns probabilities to multiple combinations of values of the behavior modulation factors, the system performs a single iteration of the process 300 to update the combined probability distribution. Thus, instead of updating the probability distribution over possible values for a given behavior modulation factor as described below, the system would instead update the combined distribution over combinations of values of the multiple different modulation factors.

The system determines a measure of central tendency, e.g., a mean, of measures of fitness for modulation durations within a first specified window (step 302). For example, the system can compute the measure of central tendency of measures of fitness for the h most recent modulation durations, where h is an integer greater than 1.

The system identifies, for each particular value of the given modulation factor, a corresponding subset of episodes in a second specified window that were generated while the particular value of the given modulation factor was selected (step 304). In some cases, the first specified window can be the same as the second specified window. In some other cases, however, the first and second windows are different, e.g., the second window can be longer than the first window.

The system identifies, for each particular value of the given modulation factor, a count of episodes in the corresponding subset that had a fitness measure that was greater than or equal to the measure of central tendency (step 306).

The system determines, for each particular value of the given modulation factor, a score from the count of episodes and the total number of modulation durations in the corresponding subset (step 308). Generally, the score is an estimate of the likelihood that an modulation duration for which the possible value of the given modulation factor was selected will have a fitness measure that is greater than or equal to the measure of central tendency. For example, the system can set the score equal to (i) ½ plus the count divided by (ii) 1 plus the total number of modulation durations in the subset.

The system determines an updated probability distribution from the respective scores for the possible values of the given modulation factor (step 310). In particular, the system normalizes the respective scores into probabilities, i.e., normalizes the scores so that the scores add to 1.

In some implementations, the system adjusts the first window, the second window, or both during the training of the neural network. For example, the system can set both windows equal to the same value and adjust the value using a regression accuracy criterion. In particular, in this example the system can repeatedly adapt the value to identify the window size that minimizes a loss that measures regression accuracy. For example, the loss can measure the squared error between (i) a fitness measure of a modulation chosen at a given time t and (ii) a quantity that represents a prediction of the fitness measure for the modulation chosen at time t given the fitnesses that have been received during current time window. In particular, the quantity can be equal to the ratio of (i) the sum of the current threshold value given the current time window and the fitnesses for the modulation over the current time window and (ii) the sum of one and the count of fitnesses for the modulation within the current time window.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for selecting actions to be performed by an agent interacting with an environment to accomplish a task, wherein the method comprises repeatedly performing operations including:
   sampling a behavior modulation from a set of possible behavior modulations in accordance with a current probability distribution over the set of possible behavior modulations, wherein:
   the behavior modulation includes a respective value for each of one or more modulation factors; and
   the behavior modulation defines an exploration policy for modifying a set of action scores that includes a respective action score for each action in a set of possible actions that can be performed by the agent to interact with the environment;
   for each of one or more time steps:
   processing an input comprising an observation characterizing a current state of the environment at the time step using an action selection neural network to generate a respective action score for each action in the set of possible actions that can be performed by the agent;

modifying the action scores using the sampled behavior modulation; and selecting the action to be performed by the agent at the time step based on the modified action scores;

determining a fitness measure corresponding to the sampled behavior modulation that characterizes an estimated progress in improving a performance of the agent in accomplishing the task that would result from training the action selection neural network on training data characterizing interaction of the agent with the environment over the one or more time steps where the action scores were modified using the sampled behavior modulation; and updating the current probability distribution over the set of possible behavior modulations using the fitness measure corresponding to the behavior modulation.

2. The method of claim 1, wherein the one or more behavior modulation factors include a behavior modulation factor that specifies a respective bias value for each action in the set of possible actions, and modifying the action scores using the sampled behavior modulation comprises adding the corresponding bias value to each action score.

3. The method of claim 1, wherein the one or more behavior modulation factors include a behavior modulation factor that specifies a temperature parameter, and modifying the action scores using the behavior modulation factor comprises dividing each action score by the temperature parameter.

4. The method of claim 1, wherein the one or more behavior modulation factors include a behavior modulation factor that specifies an $\epsilon$ probability value, and modifying the action scores using the behavior modulation comprises modifying the action scores such that, with probability given by the $\epsilon$ probability value, each action has an equal likelihood of being selected to be performed by the agent.

5. The method of claim 1, wherein the one or more behavior modulation factors include a behavior modulation factor that specifies an action-repeat probability value, and modifying the action scores using the behavior modulation factor comprises modifying the action scores such that, with probability given by the action-repeat probability value, the action selected to be performed by the agent at the time step is the action performed by the agent at a previous time step.

6. The method of claim 1, wherein:

the action score for each action is specified by data characterizing a probability distribution over possible returns that would result from the agent performing the action;

wherein the one or more behavior modulation factors include a behavior modulation factor that specifies one or more parameters of a distortion function; and modifying the action scores using the behavior modulation factor comprises, for each action, applying the distortion function to the data characterizing the probability distribution over possible returns that would result from the agent performing the action.

7. The method of claim 1, wherein the progress in improving the performance of the agent in accomplishing the task characterizes an expected difference between a cumulative measure of rewards received by the agent as a result of interacting with the environment by performing actions selected using the action selection neural network: (i) after the action selection neural network is trained on the training data characterizing the interaction of the agent with the environment over the one or more time steps where the action scores were modified using the behavior modulation, and (ii) before the action selection neural network is trained on the training data characterizing the interaction of the agent with the environment over the one or more time steps where the action scores were modified using the behavior modulation.

8. The method of claim 1, wherein determining the fitness measure comprises determining the fitness measure based on a reward received by the agent at each of the one or more time steps.

9. The method of claim 8, wherein the fitness measure is determined as a sum of the rewards received by the agent at each of the one or more time steps.

10. The method of claim 1, wherein updating the current probability distribution over the set of possible behavior modulations using the fitness measure corresponding to the behavior modulation comprises:

determining a measure of central tendency of a plurality of given fitness measures that have previously been determined; and determining an updated probability distribution based at least in part on whether the fitness measure corresponding to the behavior modulation exceeds the measure of central tendency of the plurality of given fitness measures.

11. The method of claim 10, wherein the measure of central tendency of the plurality of given fitness measures is a mean of the plurality of given fitness measures.

12. The method of claim 10, further comprising adjusting a length of a time window specifying which given fitness measures are eligible for inclusion in the plurality of given fitness measures.

13. The method of claim 1, further comprising updating current values of parameters of the action selection neural network using reinforcement learning techniques.

14. The method of claim 1, wherein selecting the action to be performed by the agent at the time step based on the modified action scores comprises:

sampling the action to be performed by the agent at the time step based on a probability distribution over the set of possible actions that is specified by the modified action scores.

15. A system for selecting actions to be performed by an agent interacting with an environment to accomplish a task, the system comprising one or more computers and one or more storage devices that when executed by the one or more computers cause the one or more computers to repeatedly perform operations comprising:

sampling a behavior modulation from a set of possible behavior modulations in accordance with a current probability distribution over the set of possible behavior modulations, wherein:

the behavior modulation includes a respective value for each of one or more modulation factors; and the behavior modulation defines an exploration policy for modifying a set of action scores that includes a respective action score for each action in a set of possible actions that can be performed by the agent to interact with the environment;

for each of one or more time steps:

processing an input comprising an observation characterizing a current state of the environment at the time step using an action selection neural network to generate a respective action score for each action in the set of possible actions that can be performed by the agent;

modifying the action scores using the sampled behavior modulation; and selecting the action to be performed by the agent at the time step based on the modified action scores;

determining a fitness measure corresponding to the sampled behavior modulation that characterizes an estimated progress in improving a performance of the agent in accomplishing the task that would result from training the action selection neural network on training data characterizing interaction of the agent with the environment over the one or more time steps where the action scores were modified using the sampled behavior modulation; and updating the current probability distribution over the set of possible behavior modulations using the fitness measure corresponding to the behavior modulation.

16. The system of claim 15, wherein the progress in improving the performance of the agent in accomplishing the task characterizes an expected difference between a cumulative measure of rewards received by the agent as a result of interacting with the environment by performing actions selected using the action selection neural network: (i) after the action selection neural network is trained on the training data characterizing the interaction of the agent with the environment over the one or more time steps where the action scores were modified using the behavior modulation, and (ii) before the action selection neural network is trained on the training data characterizing the interaction of the agent with the environment over the one or more time steps where the action scores were modified using the behavior modulation.

17. The system of claim 15, wherein determining the fitness measure comprises determining the fitness measure based on a reward received by the agent at each of the one or more time steps.

18. The system of claim 17, wherein the fitness measure is determined as a sum of the rewards received by the agent at each of the one or more time steps.

19. The system of claim 15, wherein updating the current probability distribution over the set of possible behavior modulations using the fitness measure corresponding to the behavior modulation comprises:

determining a measure of central tendency of a plurality of given fitness measures that have previously been determined; and determining an updated probability distribution based at least in part on whether the fitness measure corresponding to the behavior modulation exceeds the measure of central tendency of the plurality of given fitness measures.

20. One or more non-transitory computer-readable storage media storing instructions that when executed by one or more computers cause the one or more computers to perform operations for selecting actions to be performed by an agent interacting with an environment to accomplish a task, the operations comprising:

sampling a behavior modulation from a set of possible behavior modulations in accordance with a current probability distribution over the set of possible behavior modulations, wherein:

the behavior modulation includes a respective value for each of one or more modulation factors; and the behavior modulation defines an exploration policy for modifying a set of action scores that includes a respective action score for each action in a set of possible actions that can be performed by the agent to interact with the environment;

for each of one or more time steps:

processing an input comprising an observation characterizing a current state of the environment at the time step using an action selection neural network to generate a respective action score for each action in the set of possible actions that can be performed by the agent;

modifying the action scores using the sampled behavior modulation; and selecting the action to be performed by the agent at the time step based on the modified action scores;

determining a fitness measure corresponding to the sampled behavior modulation that characterizes an estimated progress in improving a performance of the agent in accomplishing the task that would result from training the action selection neural network on training data characterizing interaction of the agent with the environment over the one or more time steps where the action scores were modified using the sampled behavior modulation; and updating the current probability distribution over the set of possible behavior modulations using the fitness measure corresponding to the behavior modulation.

* * * * *